(12) United States Patent
Johnnie et al.

(10) Patent No.: US 10,203,964 B2
(45) Date of Patent: Feb. 12, 2019

(54) MOBILE DEVICE EXTERNAL CONTROLLER MODULE

(71) Applicant: Raytheon Company, Waltham, MA (US)

(72) Inventors: Darryn A. Johnnie, Waltham, MA (US); Andy D. Ngo, Waltham, MA (US); Stephen H. Kim, Waltham, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/686,744

(22) Filed: Aug. 25, 2017

(65) Prior Publication Data

US 2018/0136944 A1 May 17, 2018

Related U.S. Application Data

(60) Provisional application No. 62/421,588, filed on Nov. 14, 2016.

(51) Int. Cl.
*G06F 8/65* (2018.01)
*G06F 13/38* (2006.01)
*G06F 13/42* (2006.01)
*G06F 9/4401* (2018.01)

(52) U.S. Cl.
CPC .............. *G06F 9/4411* (2013.01); *G06F 8/65* (2013.01); *G06F 13/385* (2013.01); *G06F 13/4282* (2013.01); *G06F 2213/0042* (2013.01); *G06F 2213/3812* (2013.01); *G06F 2213/4004* (2013.01)

(58) Field of Classification Search
CPC .... G06F 9/45533; G06F 3/1423; G06F 9/451; G06F 9/4411; G06F 13/14; G06F 13/385; G06F 13/4282; G06F 13/4068

USPC ....... 713/2; 719/321, 323; 710/303, 304, 62, 710/8, 300, 305, 306, 63, 73
See application file for complete search history.

(56) References Cited

U.S. PATENT DOCUMENTS

| | | | |
|---|---|---|---|
| 9,935,915 B2* | 4/2018 | Manley | H04L 51/18 |
| 2005/0135393 A1* | 6/2005 | Benco | H04M 1/72527 370/408 |
| 2007/0288227 A1* | 12/2007 | Kim | H04L 29/08846 703/24 |

(Continued)

FOREIGN PATENT DOCUMENTS

WO     2009012339 A2     1/2009

OTHER PUBLICATIONS

International Search Report and Written Opinion from related PCT Application No. PCT/US2017/048989 dated Oct. 20, 2017.

*Primary Examiner* — Faisal M Zaman
(74) *Attorney, Agent, or Firm* — Burns & Levinson, LLP; Joseph M. Maraia

(57) ABSTRACT

An external controller module is configured for electrically coupling a mobile device to the one or more peripheral devices. The external controller module includes an interface port for coupling to a communication port of the mobile device and a number of interface ports for coupling the external controller module to respective peripheral devices. The controller module operating system includes device driver program code for facilitating electrical communication between the peripheral device and the mobile device without installing the device driver program code on the mobile device.

18 Claims, 3 Drawing Sheets

(56) References Cited

U.S. PATENT DOCUMENTS

| | | | |
|---|---|---|---|
| 2009/0023475 A1* | 1/2009 | Chang | H04M 1/72527 455/557 |
| 2009/0064122 A1* | 3/2009 | Bielski | G06F 8/65 717/168 |
| 2011/0145879 A1* | 6/2011 | Rajamani | G06F 3/1454 725/116 |
| 2014/0040522 A1* | 2/2014 | Varanda | G06F 13/409 710/303 |
| 2014/0372739 A1* | 12/2014 | Arroyo | G06F 8/654 713/2 |
| 2015/0121355 A1* | 4/2015 | Chang | G06F 8/654 717/168 |
| 2016/0077842 A1* | 3/2016 | Turnock | G06F 13/10 710/10 |
| 2016/0202964 A1* | 7/2016 | Butcher | G06F 8/65 717/172 |
| 2016/0299865 A1* | 10/2016 | Hetzler | G06F 13/4068 |
| 2017/0034163 A1* | 2/2017 | Priyadarshini | H04L 63/0876 |
| 2017/0249136 A1* | 8/2017 | Anand | G06F 8/65 |

\* cited by examiner

MOBILE DEVICE EXTERNAL CONTROLLER MODULE

RELATED APPLICATIONS

This application claims the benefit of and priority to U.S. Provisional Application No. 62/421,588, filed Nov. 14, 2016, the contents of which are incorporated herein by reference in their entirety.

GOVERNMENT LICENSE RIGHTS

This invention was made with Government support under contract H94003-04-D-0006-0350 awarded by Department of Defense. The Government has certain rights in the invention.

FIELD OF TECHNOLOGY

The present disclosure is in the field of wireless communication technology and more particularly in the field of interfacing wireless communication devices to peripheral devices.

BACKGROUND

Many mobile devices such as cell phones and tablet computers include an interface ports such as a Universal Serial Bus (USB) port for connecting to USB peripheral devices that function cooperatively with the USB Host mobile device. Mobile devices as described herein may include smartphones, tablet computers and other portable computing and communicating devices that are configured for connection to USB peripheral devices, for example. USB driver software for each peripheral device is conventionally installed in the mobile device. The USB driver software configures the mobile device to interact with the corresponding USB peripheral device.

Multiple USB peripheral devices can be connected to a single Universal Serial Bus port of a mobile device via USB hub device installed between the peripheral devices and the mobile device USB port. The USB hub device may have multiple USB ports for connecting to peripheral devices and is configured to direct USB communications between the peripheral devices and the mobile device USB port.

As new peripheral devices and new mobile devices become available, it is often desirable to reconfigure a mobile device for cooperating with different USB peripheral devices, or to configure a different mobile device for cooperating with previously used USB peripheral devices. The reconfiguring of USB peripheral devices or replacement of the mobile device can involve substantial development work in order to update the mobile device operating system or to develop and/or install new or updated USB driver software in the mobile device. This is particularly problematic and may involve substantial integration costs in large corporations or government entities, where it is common to upgrade or replace a large number of mobile device systems every few years.

SUMMARY

An apparatus for interfacing a mobile device to one or more peripheral devices is described according to an aspect of the present disclosure. The apparatus includes a first interface port configured for electrically coupling to a communication port of the mobile device and a second interface port configured for electrically coupling to one of the one or more peripheral devices. The first interface port and second interface port may be a standard USB interface ports, for example. The apparatus also includes processor circuitry coupled to the first interface port and the second interface port and storage circuitry coupled to the processor circuitry.

According to an aspect of the present disclosure, the storage circuitry stores an operating system executable by the processor circuitry. The operating system includes device driver program code for facilitating electrical communication between the peripheral device and the mobile device without installing the device driver program code on the mobile device. The processor circuitry is configured to intercept device driver updates directed from the peripheral device to the wireless device, and to redirect the device driver updates to update the controller module operating system. According to an aspect of the present disclosure, the processor circuitry is also configured to accept and store changes to the control module operating system without changing to an operating system of the mobile device.

In an illustrative embodiment according to aspect of the present disclosure, communication port hub circuitry is coupled to the processor circuitry and configured for coupling the additional peripheral devices to the first communication port of the mobile device. The processor circuitry is configured to control communications between the mobile device and the one or more peripheral devices and between the one or more peripheral devices. The processor circuitry is also configured for communicating with a composite USB driver of the mobile device operating system without modifying the operating system of the mobile device.

According to an aspect of the present disclosure, the apparatus also includes interface circuitry to map each peripheral device to a USB composite device type. The USB composite device type may be a network type device, a serial type device and a mass storage type device, for example.

The processor circuitry is configured to update the operating system when the peripheral device is connected for a first time to the second interface port and/or when an updated driver for the peripheral device is communicated to the processor circuitry, for example, when the mobile device is not a mobile device model or version that has been previously connected to the first interface port.

According to another aspect of the present disclosure, the processor circuitry may also be configured to monitor security of communications between the mobile device and the peripheral device, to provide a communications firewall between the mobile device and the peripheral and/or to manage power requirements of the peripheral device.

Another aspect of the present disclosure includes a method for configuring a communication pathway between a mobile device and one or more peripheral devices by coupling an external controller module between a mobile device to the one or more peripheral devices. The external controller module includes a first interface port configured for electrically coupling the external controller module to a communication port of the mobile device and a second interface port configured for electrically coupling the external controller module to a peripheral device. Processor circuitry in the external controller module is coupled to the first interface port and the second interface port. Storage circuitry in the external controller module is coupled to the processor circuitry. The storage circuitry stores a controller module operating system executable by the processor circuitry. The controller module operating system includes device driver program code for facilitating electrical communication between the peripheral device and the mobile device without installing the device driver program code on the mobile device.

In an illustrative embodiment, the method may also include configuring or programming the processor circuitry to intercept device driver updates directed from one of the one or more peripheral devices to the mobile device, to redirect the device driver updates to update the controller module operating system. The method may also include configuring or programming the external controller module to accept and store changes to the controller module operating system without changing the operating system of the mobile device.

The method may also include configuring or programming the external controller module to update the controller operating system when an updated driver for the peripheral device is communicated to the external controller module and/or when an updated driver for the peripheral device is communicated to the processor circuitry, for example, when the mobile device is not a mobile device model or version that has been previously connected to the first interface port.

According to another aspect of the present disclosure, the method may also include configuring or programming the external controller module to monitor security of communications between the mobile device and the peripheral device.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION

Figure 1:
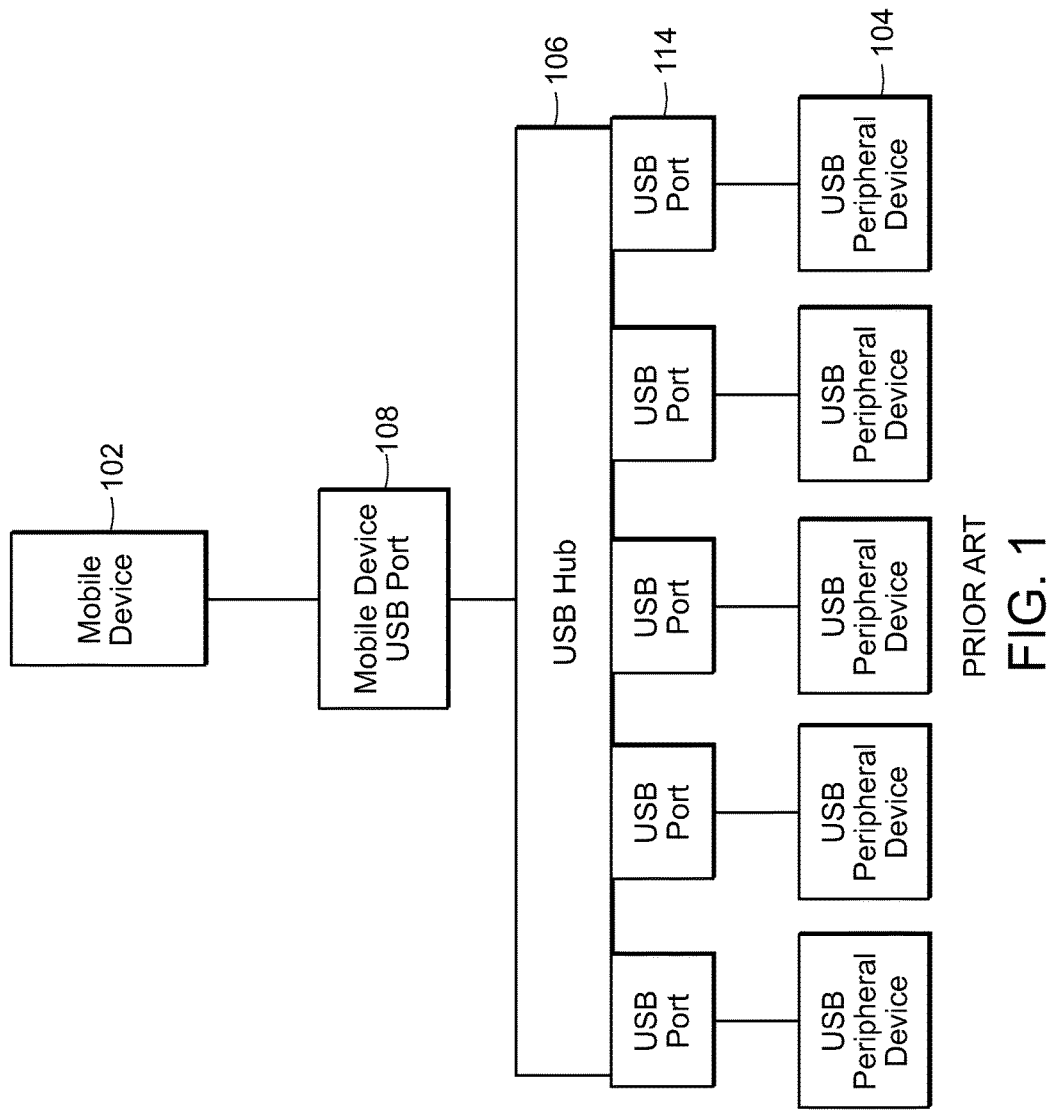
FIG. 1 is a diagram of a conventional USB interface and hub configuration.

Exemplary embodiments of the present inventive concept will be described more fully hereinafter with reference to the accompanying drawings. Like reference numerals may refer to like elements throughout the accompanying drawings.

It will be understood that when an element is referred to as being "connected" or "coupled" to another element, it can be directly connected or coupled to the other element or intervening elements may be present.

As used herein, the singular forms "a," "an" and "the" are intended to include the plural forms as well, unless the context clearly indicates otherwise.

An example of a USB interface in a conventional mobile device and USB peripheral system is described with reference to FIG. 1. A mobile device 102 is coupled to one or more USB peripheral devices 104 via a USB hub 106. The USB hub 106 expands a single USB port 108 on the mobile device 102 so that the USB peripheral devices 104 can connect to the mobile device 102. The USB hub 106 is logically transparent, such that the mobile device 102 communicates directly with the USB peripherals 104. The mobile device's operating system generally includes drivers for each of the USB peripherals.

Aspects of the present disclosure include an external controller module that is configured for connecting between a mobile device and one or more peripheral devices. The external controller unit is configured for efficiently receiving, storing and executing driver software for new or updated USB devices when the new or updated USB devices are connected to the external controller module. The external controller module prevents the updated USB driver software from being installed in the mobile device and instead updates its own operating system to act as an intermediary and maintain functional communication between the new or updated USB peripheral devices.

Figure 2:
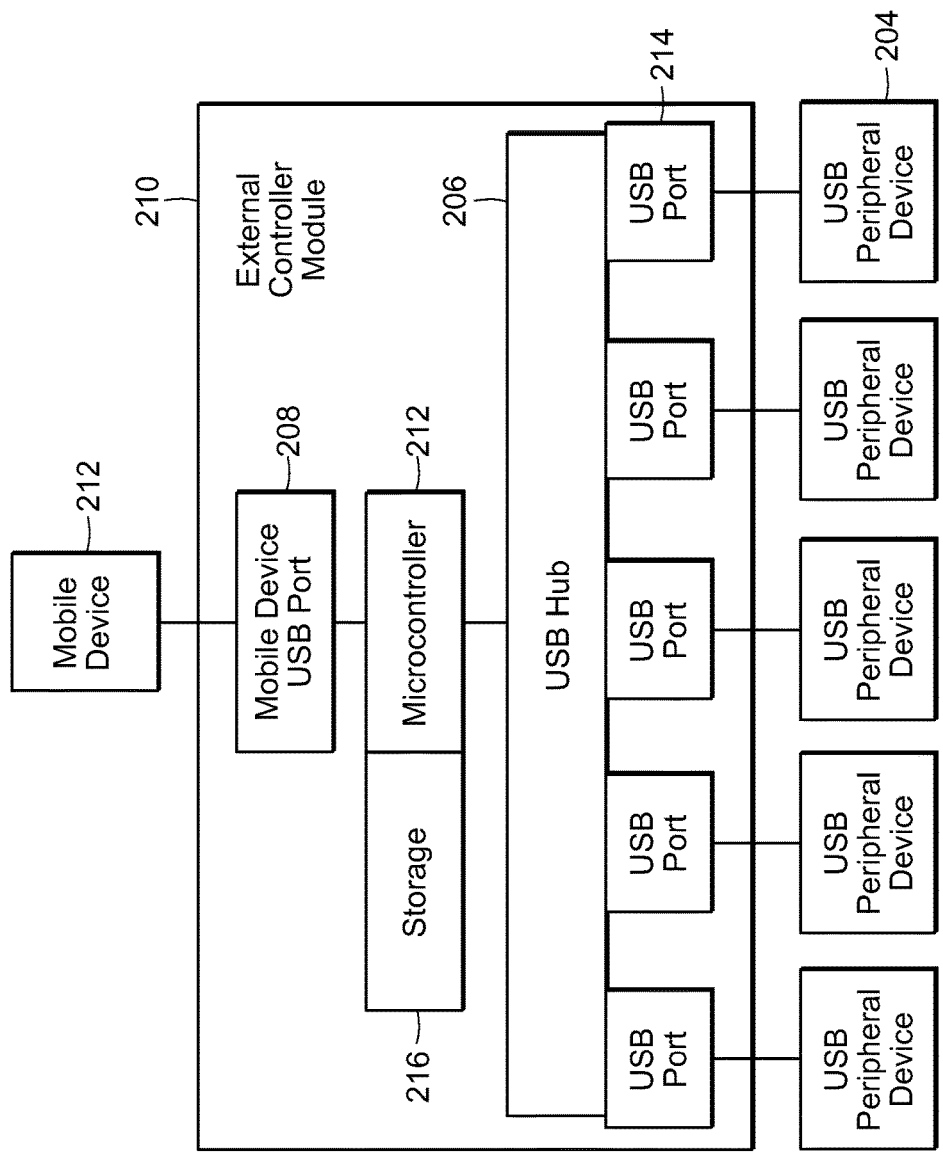
FIG. 2 is a diagram of an external controller module according to an aspect of the present disclosure.

Referring to FIG. 2, an external controller module 210 according to an aspect of the present disclosure isolates the mobile device 218 from the USB peripheral devices 204. This allows the mobile device 218 to function cooperatively with the new or updated USB peripheral devices 204 without updating the mobile device 218 or the mobile device operating system.

The external controller module 210 includes microcontroller circuitry 212 coupled to USB hub circuitry 206 and to a first USB port 208 for coupling to a mobile device 218. The external controller module 210 also includes storage circuitry 216 coupled to the microcontroller circuitry 212. The USB hub circuitry 206 includes one or more additional or second USB ports 214 for coupling to respective USB peripheral devices 204. Operating system software of the external controller device 210 and/or USB device driver software for the peripheral devices 204 may be stored in the storage circuitry 216, for example.

The USB hub circuitry provides a communication path between the USB peripheral devices 204 and the microcontroller circuitry 212. The USB hub circuitry 206 expands functionality of the first USB port 208 so that multiple USB peripheral devices 204 can communicate with the mobile device 218 via the microcontroller circuitry 212.

According to an aspect of the present disclosure, the microcontroller circuitry 212 is configured or programmed to direct new or updated USB driver software to the storage circuitry 216 when a new or updated USB peripheral device 204 is connected to one of the second USB ports 214. The microcontroller circuitry 212 is also configured or programmed to prevent the new or updated USB driver software from being communicated to or installed in the mobile device 218.

The microcontroller circuitry 212 is responsive to the updated USB driver software that is installed in the storage circuitry 216 to enable communication with corresponding peripheral devices 204. According to an aspect of the present disclosure the microcontroller circuitry 212 is configured or programmed to translate communications from the new or upgraded peripheral devices 204 to the mobile device 218, such communication with the mobile device 218 via the first interface 208 are in a format compatible with a legacy USB driver software installed in the mobile device 218, and communications with the new or updated USB peripheral device 204 via the respective USB port 214 are in a format compatible with the new or updated USB driver software.

According to aspects of the present disclosure, the external controller module's operating system can be easily updated with new or updated USB device drivers instead of changing the mobile device to accommodate attachment of new or updated USB peripheral devices. USB device driver updates for new or updated USB peripherals are thereby localized to the external controller module.

Configuring the disclosed external controller module between a mobile device and one or more USB peripheral devices as described herein allows the mobile device to communicate and function in cooperation with new, updated or custom USB peripheral devices without updating the operating system or USB device drivers of the mobile devices.

The external controller module controls all communication between the USB Host mobile device and the USB peripherals, and all communication between the mobile device and devices, or between devices, is through the external controller module.

The disclosed external controller module presents all of its connected USB peripheral devices as a single composite USB device to a standard USB interface of the mobile device using standard USB interfaces. According to an aspect of the present disclosure, USB peripheral devices are mapped to a composite USB driver, which is a built-in feature of some conventional mobile device operating systems. This reduces processing and memory loads on the mobile device. The composite USB driver includes driver software for communicating with serial type USB devices, network type USB devices and mass storage type USB devices, for example.

An illustrative embodiment of the disclosed external controller module is configured to communicate with a Linux based device driver called Multifunction Composite Gadget USB driver. The Multifunction Composite Gadget USB driver is a built in feature of the popular Android operating system by Google of Mountain View, Calif., USA. The Multifunction Composite Gadget USB driver includes driver software for network type USB devices, serial type USB devices and mass storage type USB devices. In the illustrative embodiment, the disclosed external controller module maps each USB peripheral connected to the external controller module to one of the USB device types in the Multifunction Composite Gadget USB driver. Because Linux software development tools includes support for the Multifunction Composite Gadget USB driver, no changes to the mobile device are needed to implement this embodiment of the disclosed external controller module.

According to another aspect of the present disclosure, the external controller module may be programmed or configured to forward data packets between multiple USB peripheral devices that are connected to the external module, and/or to manage power distribution among the USB peripheral devices that are connected to the external controller module. The external controller module may also be programmed or configured to partition communication bandwidth to different USB peripheral devices connected to the external controller module based on predetermined Quality of Service (QoS) parameters, for example.

Another illustrative embodiment of the disclosed external controller module can provide additional protection for the mobile device by providing firewall functionality and other security monitoring, for example. In an illustrative embodiment, the disclosed external controller module may also be configured to include a diagnostic capability for troubleshooting and allow for programming in the field.

These additional functionalities of the external controller module further reduces the changes to the mobile device and reduces the mobile device's processing and storage requirements as compared to conventional mobile devices, which have limited peripheral management capabilities due to their limited processing power and other hardware limitations.

In another illustrative embodiment, the disclosed external controller module may be configured as a test platform that displays USB peripheral performance metrics, such as number and class of devices connected, connection errors, Built-in Test (BIT) results and throughput, in order to assist system developers and integrators validate their products and the overall system.

Figure 3:
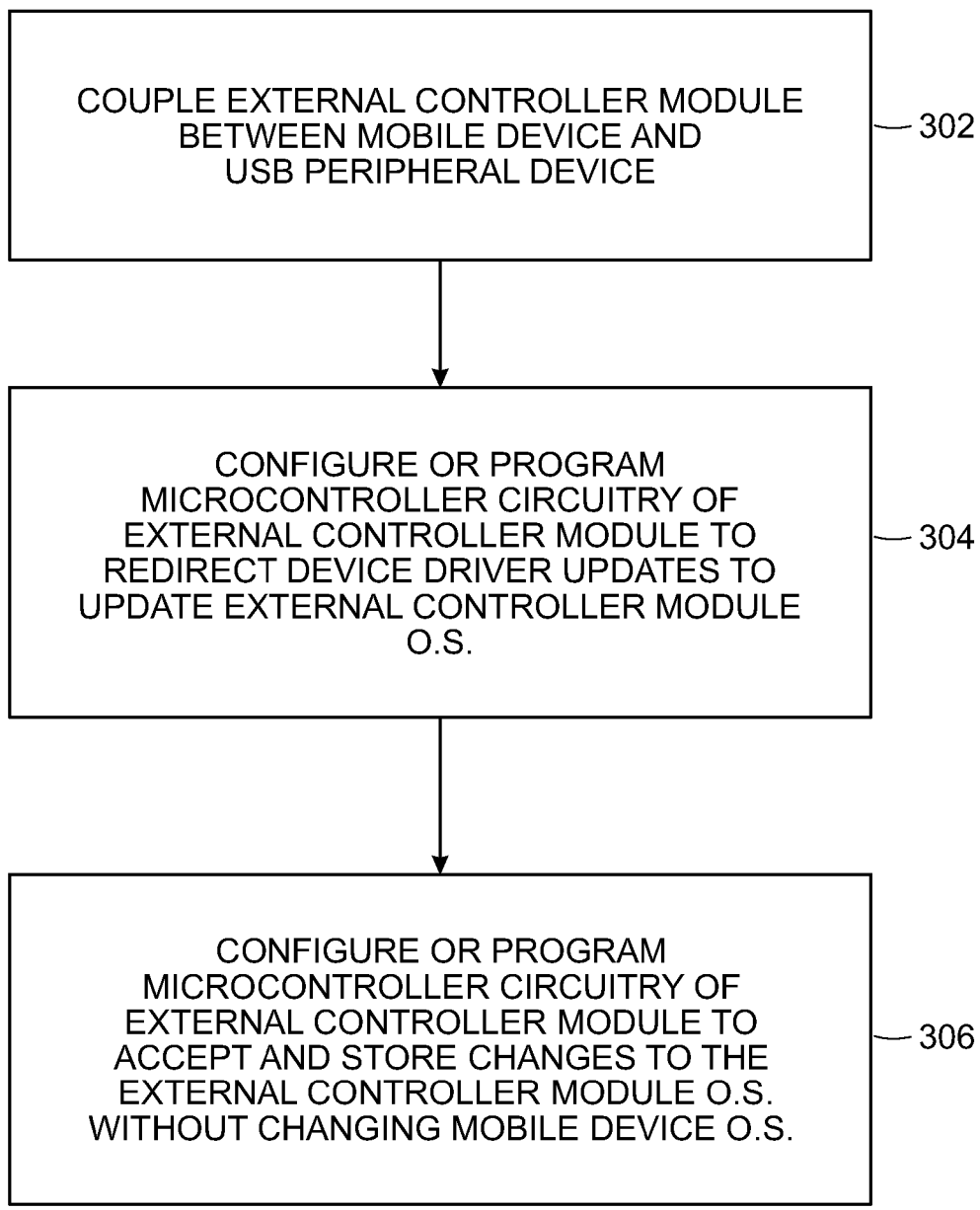
FIG. 3 is a process flow diagram showing a method for configuring a communication pathway between a mobile device and one or more peripheral devices according to an aspect of the present disclosure.

A method for configuring a communication pathway between a mobile device and one or more peripheral devices according to an aspect of the present disclosure is described with reference to FIG. 3. At block 302, the method includes coupling an external controller module between a mobile device and the one or more peripheral devices.

According to aspects of the present disclosure, the external controller module includes a first interface port configured for electrically and communicatively coupling the external controller module to a communication port of the mobile device, and one or more second interface ports configured for electrically and communicatively coupling the external controller module to one or more respective peripheral devices. The external controller module also includes microcontroller circuitry coupled to the first interface port and the second interface ports, and storage circuitry coupled to the microcontroller circuitry. The storage circuitry stores a controller module operating system executable by the microcontroller circuitry. According to an aspect of the present disclosure, the controller module operating system including device driver program code for facilitating electrical communication between the peripheral device and the mobile device without installing the device driver program code on the mobile device.

At block, 304, the method includes configuring or programming the microcontroller circuitry to intercept device driver updates directed from a peripheral device to the mobile device, to redirect the device driver updates to update the controller module operating system.

At block 306, the method includes configuring or programming the external controller module to accept and store changes to the controller module operating system without changing the operating system of the mobile device. More specifically, the method includes configuring or programming the microcontroller circuitry of the external controller module to accept and store in the storage circuitry changes to the external controller module operating system without changing the mobile device operating system.

The inventive concept may be applied to various mobile applications according to exemplary embodiments of the inventive concept.

While aspects of the present disclosure have been particularly shown and described with reference to the exemplary embodiments thereof, it will be understood by those of ordinary skill in the art that various changes in form and detail may be made therein without departing from the scope of the present disclosure as defined by the following claims.

The invention claimed is:

1. An apparatus for interfacing a mobile device to one or more peripheral devices, the apparatus comprising:
   a first interface port configured for electrically coupling to a communication port of the mobile device;
   a second interface port configured for electrically coupling to one of the one or more peripheral devices;
   processor circuitry coupled to the first interface port and the second interface port;
   storage circuitry coupled to the processor circuitry, the storage circuitry storing a controller module operating system executable by the processor circuitry, the controller module operating system including device driver program code for facilitating electrical communication between the peripheral device and the mobile device without installing the device driver program code on the mobile device;

wherein the processor circuitry is configured to intercept device driver updates directed from the peripheral device to the mobile device, and to redirect the device driver updates to update the controller module operating system.

2. The apparatus of claim 1, wherein the first interface port comprises a standard USB interface port and wherein the second interface port comprises a standard USB interface port.

3. The apparatus of claim 1, wherein the processor circuitry is configured to accept and store changes to the controller module operating system without changing to a mobile device operating system of the mobile device.

4. The apparatus of claim 1, comprising:
communication port hub circuitry coupled to the processor circuitry and configured for coupling one or more additional peripheral devices to the first communication port of the mobile device,
wherein the processor circuitry is configured to control communications between the mobile device and the one or more peripheral devices and between the one or more peripheral devices.

5. The apparatus of claim 4, wherein the processor circuitry is configured for communicating with a composite USB driver of the mobile device operating system without modifying the mobile device operating system.

6. The apparatus of claim 4, comprising interface circuitry to map each peripheral device to a USB composite device type.

7. The apparatus of claim 6, wherein the USB composite device type is in the group consisting of a network type device, a serial type device and a mass storage type device.

8. The apparatus of claim 1, wherein the processor circuitry is configured to update the controller module operating system when the peripheral device is connected for a first time to the second interface port.

9. The apparatus of claim 1, wherein the processor circuitry is configured to update the controller module operating system when an updated driver for the peripheral device is communicated to the processor circuitry.

10. The apparatus of claim 1, wherein the processor circuitry is configured to update the controller module operating system when the mobile device is not in a group consisting of a mobile device model previously connected to the first interface port, or a mobile device version previously connected to the first interface port.

11. The apparatus of claim 1, wherein the processor circuitry is configured to monitor security of communications between the mobile device and the peripheral device.

12. The apparatus of claim 1, wherein the processor circuitry is configured to provide a communications firewall between the mobile device and the peripheral device.

13. The apparatus of claim 1, wherein the processor circuitry is configured to manage power requirements of the peripheral device.

14. A method for configuring a communication pathway between a mobile device and one or more peripheral devices, comprising:
coupling an external controller module between a mobile device to the one or more peripheral devices, the external controller module comprising:
a first interface port configured for electrically coupling the external controller module to a communication port of the mobile device;
a second interface port configured for electrically coupling the external controller module to a peripheral device;
processor circuitry in the external controller module coupled to the first interface port and the second interface port;
storage circuitry in the external controller module coupled to the processor circuitry, the storage circuitry storing a controller module operating system executable by the processor circuitry,
wherein the controller module operating system includes device driver program code for facilitating electrical communication between the peripheral device and the mobile device without installing the device driver program code on the mobile device;
the method further comprising configuring or programming the processor circuitry to intercept device driver updates directed from one of the one or more peripheral devices to the mobile device, to redirect the device driver updates to update the controller module operating system.

15. The method of claim 14, comprising configuring or programming the external controller module to accept and store changes to the controller module operating system without changing a mobile device operating system of the mobile device.

16. The method of claim 14, comprising configuring or programming the external controller module to update the controller module operating system when an updated driver for the peripheral device is communicated to the external controller module.

17. The method of claim 14, comprising configuring or programming the external controller module to update the controller module operating system when the mobile device is not in a group consisting of a mobile device model previously connected to the first interface port, or a mobile device version previously connected to the first interface port.

18. The method of claim 14, comprising configuring or programming the external controller module to monitor security of communications between the mobile device and the peripheral device.

* * * * *